United States Patent
Kolmanovsky et al.

(10) Patent No.: US 6,736,105 B1
(45) Date of Patent: May 18, 2004

(54) CONTROL SYSTEM FOR DIRECT INJECTION SPARK IGNITION ENGINES WITH A CAM PROFILE SWITCHING DEVICE

(75) Inventors: Ilya V. Kolmanovsky, Ypsilanti, MI (US); Jing Sun, Bloomfield, MI (US); Yong-Wha Kim, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/281,936

(22) Filed: Oct. 29, 2002

(51) Int. Cl.$^7$ ................................................. F02B 31/00
(52) U.S. Cl. ..................... 123/306; 123/308; 123/90.18
(58) Field of Search .......................... 123/90.15, 90.16, 123/90.18, 306, 308, 295, 305

(56) References Cited

U.S. PATENT DOCUMENTS

| | | | |
|---|---|---|---|
| 5,896,840 A | 4/1999 | Takahashi | 123/295 |
| 5,947,079 A | 9/1999 | Sivashanker et al. | 123/295 |
| 6,182,636 B1 | 2/2001 | Russell et al. | 123/399 |
| 6,219,611 B1 | 4/2001 | Russell | 701/105 |
| 6,244,244 B1 | 6/2001 | Fuwa et al. | 123/295 |
| 6,250,283 B1 | 6/2001 | Russell et al. | 123/361 |
| 6,378,484 B1 | 4/2002 | Russell et al. | 123/295 |
| 6,397,813 B1 | 6/2002 | Han et al. | 123/308 |
| 6,467,442 B2 * | 10/2002 | Russell et al. | 123/90.15 |
| 6,470,869 B1 * | 10/2002 | Russell et al. | 123/681 |

OTHER PUBLICATIONS

C. Dopson and T. Drake, "Emissions Optimisation by Camshaft Profile Switching" SAE International Congress and Exposition, Paper No. 910838 pp. 195–205 (published Jan. 1, 1991).

* cited by examiner

Primary Examiner—Bibhu Mohanty (57) ABSTRACT

A system and method for controlling air charge motion in the cylinder of a direct injection spark ignition engine during transitions between different combustion modes is provided. The system includes a cam profile switching device that controls the position of an intake valve for the cylinder. The system further includes an electronic control unit configured to control the cam profile switching device to position the intake valve in a first position in advance of the transition and to move the intake valve to a second position when a predetermined condition for transitioning between the two combustion modes is met.

20 Claims, 5 Drawing Sheets

CONTROL SYSTEM FOR DIRECT INJECTION SPARK IGNITION ENGINES WITH A CAM PROFILE SWITCHING DEVICE

BACKGROUND OF THE INVENTION

1. Field of the Invention

This invention relates to engine control systems and, in particular, to a method and system for controlling air charge motion in the cylinders of a direct injection spark ignition (DISI) engine.

2. Discussion of Related Art

In a DISI engine, the fuel injection nozzle is located inside the combustion chamber rather than the induction pipe as in conventional multi-port or throttle body fuel injection engines. This allows a DISI engine to form a stratified air charge composition in the engine cylinders and to burn air-fuel mixtures having air-fuel ratios that deviate substantially from the stoichiometric air-fuel ratio (14.7:1). DISI engines also have improved thermal efficiency and reduced engine knock as compared to conventional multi-port or throttle body fuel injected engines.

DISI engines are capable of operating in a plurality of different combustion modes including a homogenous combustion mode, a stratified combustion mode, and a hybrid combustion mode. In a homogenous combustion mode, a homogenous air-fuel mixture is present within a cylinder during a combustion event. In a stratified combustion mode, a stratified air-fuel mixture is present within the cylinder. Depending upon the mode of operation, the air charge composition and air charge motion must be adjusted to optimize the combustion process.

In most conventional DISI engines, a swirl control valve actuated by a stepper motor is used to control air charge motion. These conventional engines have a significant drawback. During a transition between combustion modes, the air charge composition changes. For example, when transitioning from a stratified combustion mode to a homogenous combustion mode, there is typically an air-fuel ratio gap (e.g., from >22:1 to <20:1). As a result, a step change in the fueling rate frequently occurs at the switching instant between combustion modes. The step change in the fueling rate can cause a significant torque disturbance.

The inventors herein have recognized a need for a method and system for controlling air charge motion in a cylinder of an internal combustion engine during a transition between two combustion modes that will minimize and/or eliminate one or more of the above-identified deficiencies.

SUMMARY OF THE INVENTION

The present invention provides a method and system for controlling air charge motion in a cylinder of an internal combustion engine during a transition between first and second combustion modes.

A method in accordance with the present invention includes the step of: positioning an intake valve for the cylinder in a first position in advance of the transition using a cam profile switching device. For example, during a transition from a stratified combustion mode to a homogenous combustion mode, the intake valve may be placed in a long valve lift position to hasten egress of air from the engine's intake manifold. The method may further include the step of moving the intake valve to a second position using the cam profile switching device when a predetermined condition for transitioning between the first and second combustion modes is met. Continuing with the above example, the cam profile switching device may move the intake valve to a short valve lift position to reduce air induction into the cylinder.

A system in accordance with the present invention may include a cam profile switching device coupled to an intake valve for the cylinder. The system may further include an electronic control unit configured to control the cam profile switching device to position the intake valve in a first position in advance of the transition and move the intake valve to a second position when a predetermined condition for transitioning between the first and second combustion modes is met.

A system and method in accordance with the present invention is advantageous. Control of the cylinder intake valve using a cam profile switching device allows changes in valve lift during a single engine event. As a result, air charge motion can be directly and more quickly controlled than by using a swirl control valve or electronic throttle. The transition between combustion modes is therefore accomplished more quickly and LNT purge efficiency and fuel economy is improved. Further, a step change in the air charge can be effected during the transition between combustion modes thereby avoiding the need for a step change in the fueling rate and reducing torque disturbance and increasing drivability performance.

These and other advantages of this invention will become apparent to one skilled in the art from the following detailed description and the accompanying drawings illustrating features of this invention by way of example.

DESCRIPTION OF EMBODIMENTS OF THE INVENTION

Figure 1:
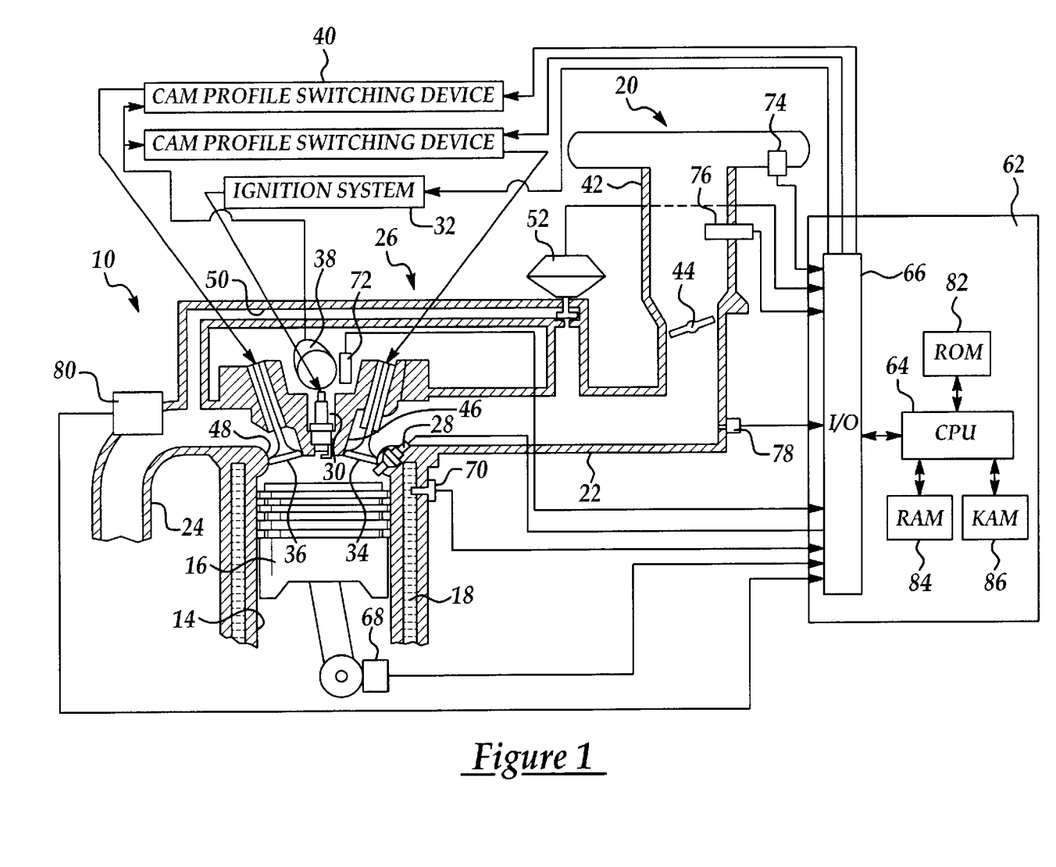
FIG. 1 is a schematic diagram illustrating an internal combustion engine incorporating a system for controlling air charge motion in a cylinder of the engine during a transition between first and second combustion modes in accordance with the present invention.

Referring now to the drawings wherein like reference numerals are used to identify identical components in the various views, FIG. 1 illustrates an internal combustion engine 10 and a system 12 in accordance with the present invention for controlling air charge motion in a cylinder 14 of engine 10 during a transition between first and second combustion modes. The air charge motion is controlled to quicken the transition between combustion modes and to reduce torque disturbances occurring during the transition.

Engine 10 is designed for use in a motor vehicle. It should be understood, however, that engine 10 may be used in a wide variety of applications. Engine 10 comprises a direct injection spark ignition (DISI) engine. Engine 10 provides motive energy to a motor vehicle or other device and is conventional in the art. Engine 10 may define a plurality of combustion chambers or cylinders 14 and may also include a plurality of pistons 16, coolant passages 18, a throttle assembly 20, an intake manifold 22, an exhaust manifold 24, and engine gas recirculation (EGR) system 26, fuel injectors 28, spark plugs 30, an ignition system 32, intake valves 34, exhaust valves 36, camshaft 38, and one or more cam profile switching devices 40.

Cylinders 14 provide a space for combustion of an air/fuel mixture to occur and are conventional in the art. In the illustrated embodiment, only one cylinder 14 is shown. It will be understood, however, that engine 10 may define a plurality of cylinders 14 and that the number of cylinders 14 may be varied without departing from the spirit of the present invention.

Pistons 16 are coupled to a crankshaft (not shown) and drive the crankshaft responsive to an expansion force of the air-fuel mixture in cylinders 14 during combustion. Pistons 16 are conventional in the art and a piston 16 may be disposed in each cylinder 14.

Coolant passages 18 provide a means for routing a heat transfer medium, such as a conventional engine coolant, through engine 10 to transfer heat from cylinders 14 to a location external to engine 10. Passages 18 are conventional in the art.

Throttle assembly 20 controls the amount of air delivered to intake manifold 22 and cylinders 14. Assembly 20 is conventional in the art and may include a throttle body 42 and a throttle plate 44 disposed therein for regulating the amount of airflow through body 42 to manifold 22. It should be understood that assembly 20 may be electronically controlled.

Intake manifold 22 provides a means for delivering charged air to cylinders 14. Manifold 22 is conventional in the art. An inlet port 46 is disposed between manifold 22 and each cylinder 14.

Exhaust manifold 24 is provided to vent exhaust gases from cylinders 14 after each combustion event. Manifold 24 is also conventional in the art and may deliver exhaust gases to a catalytic converter (not shown). An exhaust port 48 is disposed between manifold 24 and each cylinder 14.

EGR system 26 is provided to return a portion of the exhaust gases to cylinders 14 in order to reduce emissions of combustion by-products. EGR system 26 includes a passage 50 that extends from exhaust manifold 24 to intake manifold 20 and an EGR valve 52 that may be disposed within passage 50 to control the delivery of recirculated exhaust gases to intake manifold 22.

Fuel injectors 28 are provided to deliver fuel in controlled amounts to cylinders 14 and are conventional in the art. Although only one fuel injector 28 is shown in the illustrated embodiment, it will again be understood that engine 10 will include additional fuel injectors for delivering fuel to other cylinders 14 in engine 10.

Spark plugs 30 are provided to ignite the air/fuel mixture in cylinders 14. Spark plugs 30 are also conventional in the art. Although only one spark plug is shown in the illustrated embodiment, it should be understood that each cylinder 14 will include at least one spark plug 30.

Ignition system 32 delivers electrical current to spark plugs 30. System 32 is conventional in the art and may comprise a solid-state ignition system (i.e., a distributor-less system).

Intake valves 34 open and close each intake port 46 to control the delivery of air to the respective cylinder 14. Intake valves 34 are conventional in the art. Although only one intake valve is shown in the illustrated embodiment, it should be understood that multiple intake valves may be used for each cylinder 14.

Exhaust valves 36 open and close each exhaust port 48 to control the venting of exhaust gases from the respective cylinder 14 and are also conventional in the art. Again, although only one exhaust valve is shown in the illustrated embodiment, it should be understood that multiple exhaust valves may be used for each cylinder 14.

Camshaft 38 is provided to control the opening and closing of intake valves 34 and exhaust valves 36 in each of cylinders 14. Camshaft 38 is conventional in the art and may be controlled by an actuator (not shown) responsive to control signals generated by the vehicle's electronic control unit (ECU). Camshaft 38 may have multiple cams disposed thereon having different cam profiles for variable control of intake valves 34 and exhaust valves 36. It will be understood that more than one camshaft may be used to control the opening and closing of intake valves 34 and exhaust valves 36.

Figure 2:
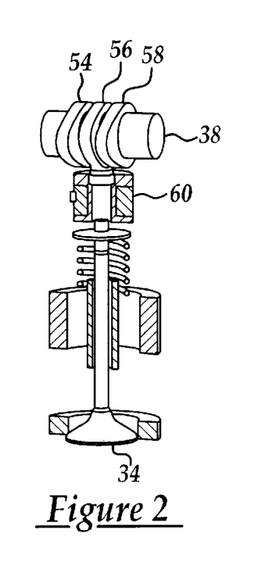
FIG. 2 is a perspective view illustrating a cam profile switching device.

Cam profile switching devices 40 are provided to allow the use of multiple cam profiles on camshaft 38 to control actuation of intake valves 34 and exhaust valves 36. Devices 40 are conventional in the art. See, e.g., Dopson et al., "Emissions Optimisation by Camshaft Profile Switching" SAE 910838 pp. 195–205 (1991), the entire disclosure of which is incorporated herein by reference. Referring to FIG. 2, one example of a device 40 is illustrated. Camshaft 38 may include three cams 54, 56, 58 disposed thereon with cams 54, 58 having identical profiles and cam 56 having a different profile. A hydraulic switch 60 is used to selectively couple intake valve to cam 56 thereby enabling variable valve lift. Switch 60 may be controlled responsive to a signal from the vehicle's electronic control unit.

System 12 is provided to control air charge motion in cylinder 14 of engine 10 during a transition between first and second combustion modes. System 12 may form part of a larger system for controlling engine 10. System 12 may include cam profile switching devices 40 and an electronic control unit (ECU) 62.

ECU 62 is provided to control engine 10. ECU 62 may comprise a programmable microprocessor or microcontroller or may comprise an application specific integrated circuit (ASIC). ECU 62 may include a central processing unit (CPU) 64 and an input/output (I/O) interface 66. Through interface 66, ECU 62 may receive a plurality of input signals including signals generated by conventional sensors such as a profile ignition pickup (PIP) sensor 68, a engine coolant temperature sensor 70, a cylinder identification (CID) sensor 72, an air temperature sensor 74, a mass air flow (MAF) sensor 76, a manifold absolute pressure (MAP) sensor 78, and a Heated Exhaust Gas Oxygen (HEGO) sensor 80. Also through interface 66, ECU 62 may generate a plurality of output signals including one or more signals used to control fuel injectors 28, spark plugs 30, camshaft 38, EGR valve 52, and cam profile switching devices 40. ECU 62 may also include one or more memories including, for example, Read Only Memory (ROM) 82, Random Access Memory (RAM) 84, and a Keep Alive Memory (KAM) 86 to retain information when the ignition key is turned off.

Figure 3A:
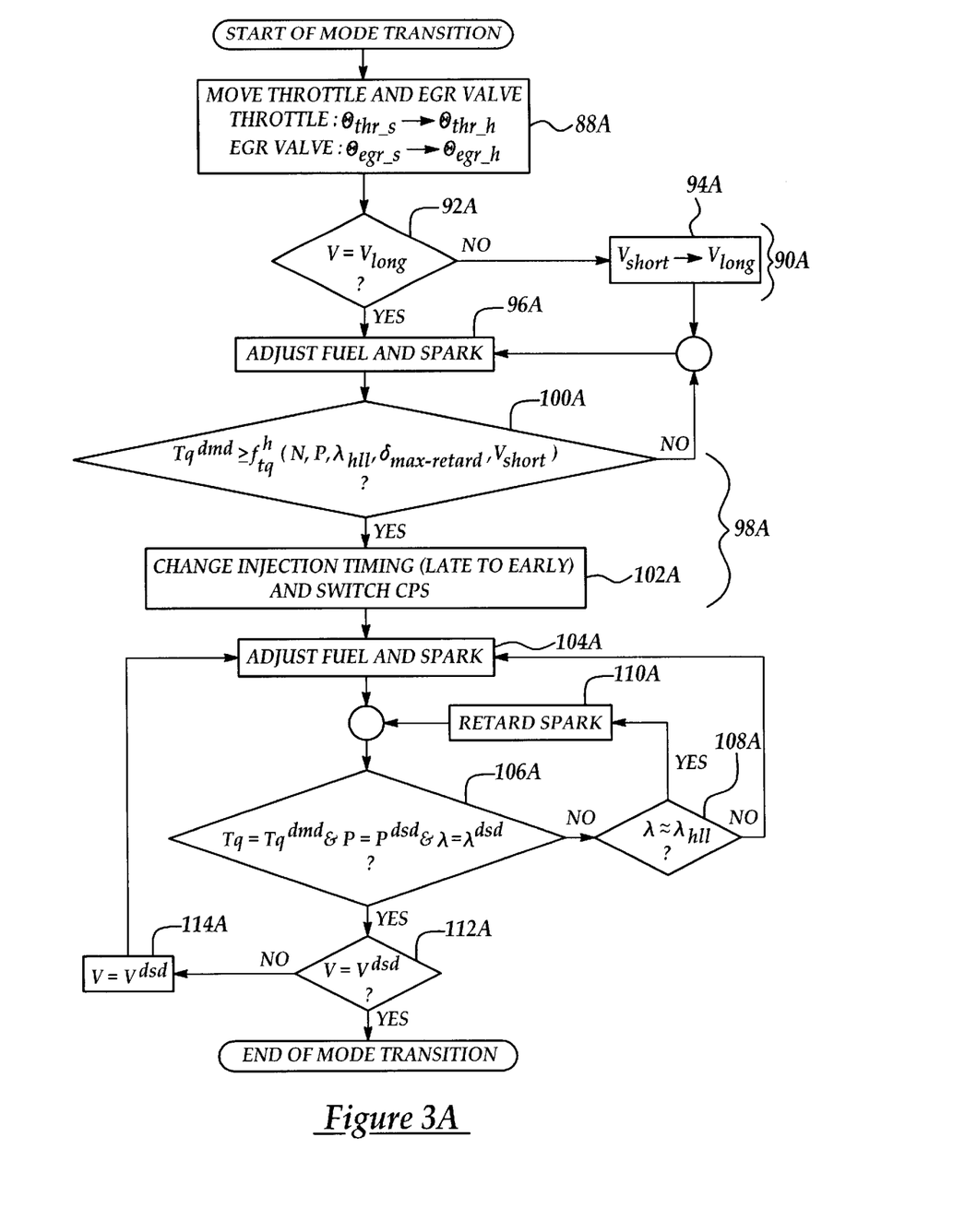
FIGS. 3A–B are flow chart diagrams illustrating several embodiments of a method for controlling air charge motion in a cylinder of the engine during a transition between first and second combustion modes in accordance with the present invention.
Figure 3B:
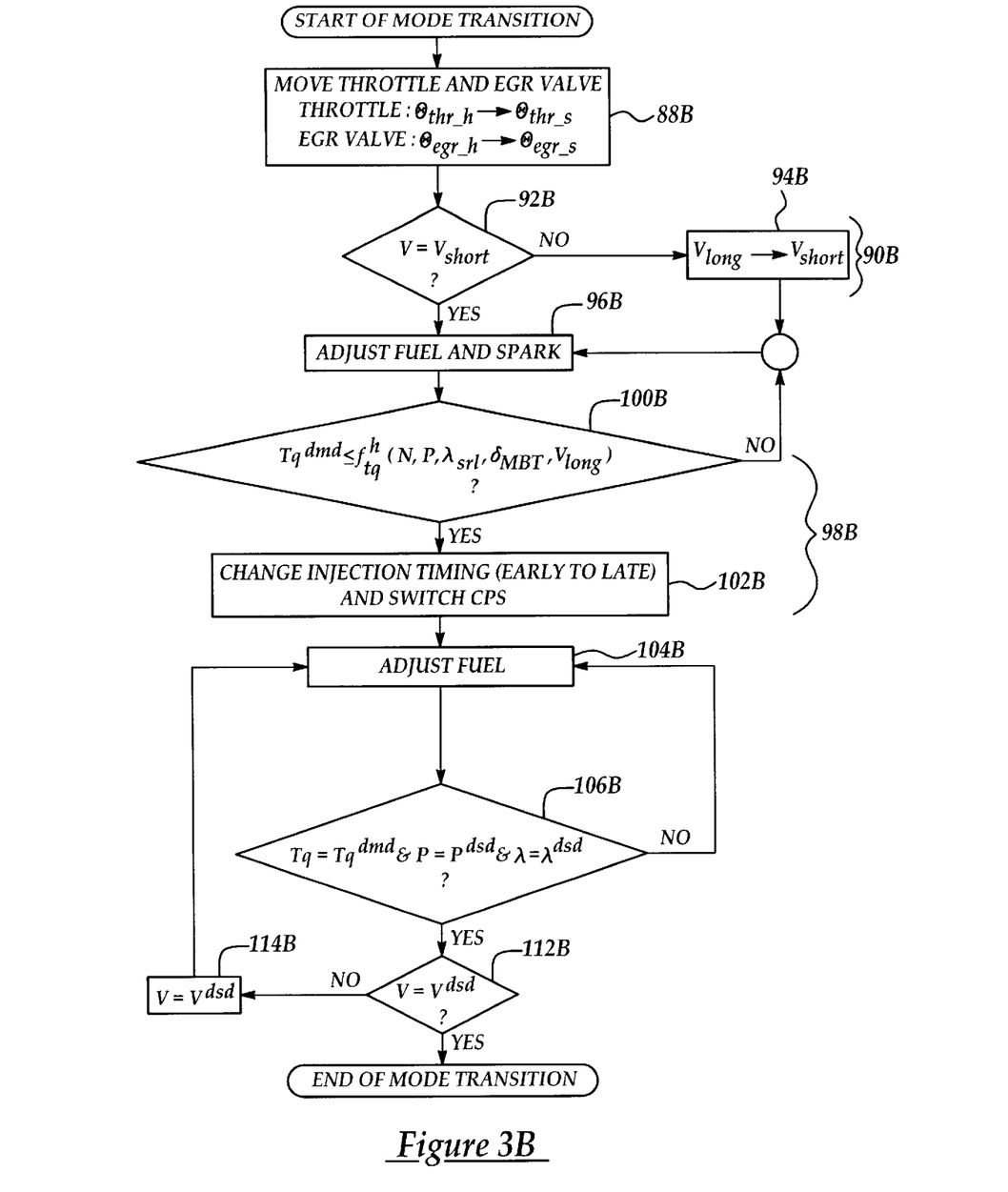
Figure 4A:
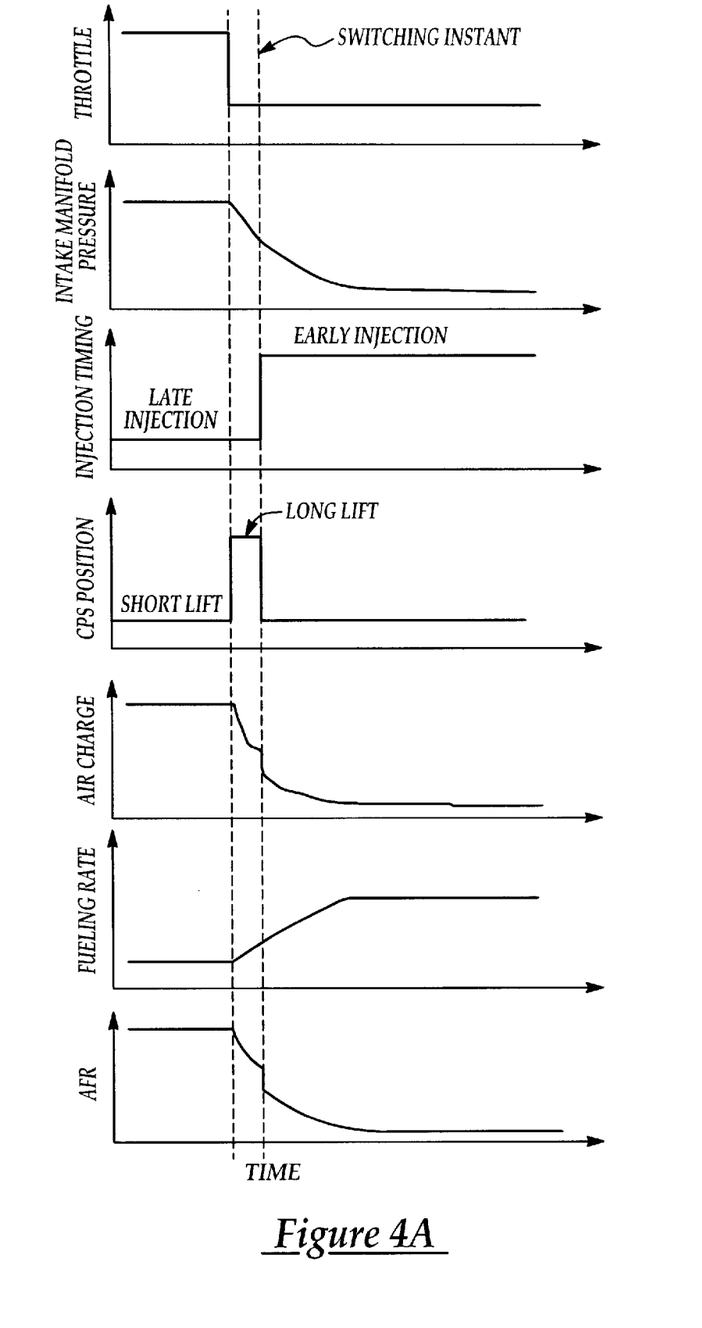
FIGS. 4A–B are timing diagrams illustrating values for several variables in the engine of FIG. 1 over time during implementation of the method of FIG. 3A–B.
Figure 4B:
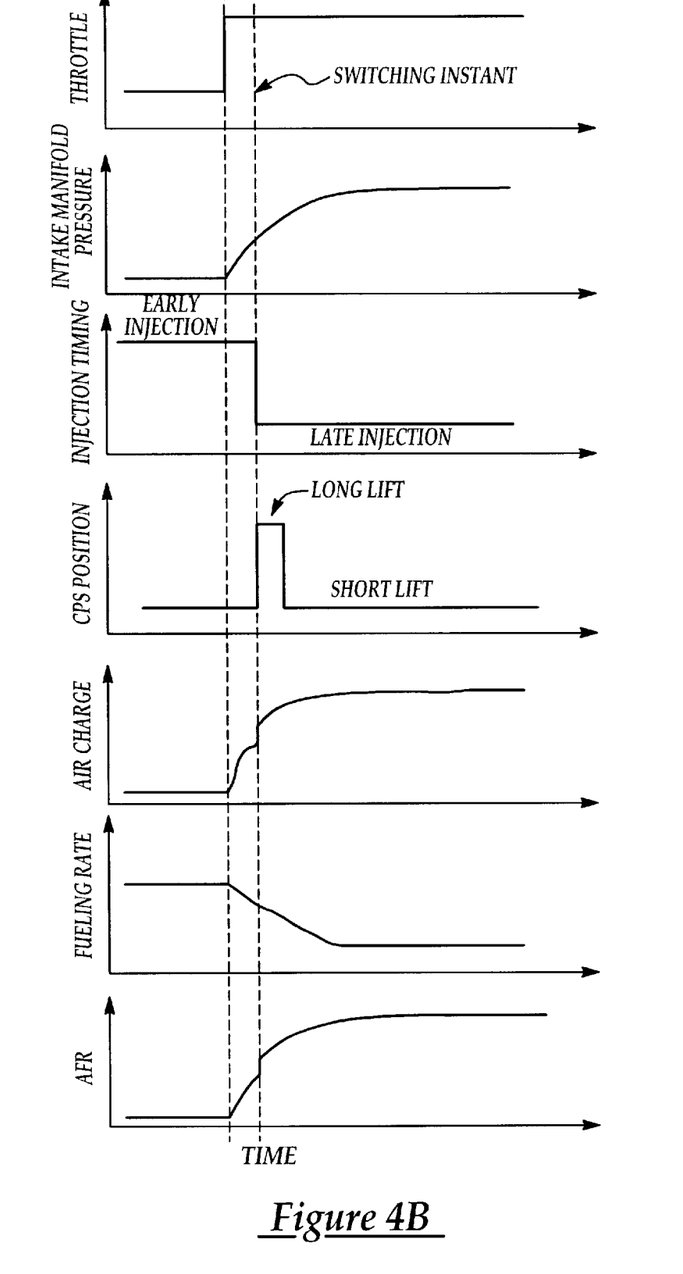

Referring now to FIGS. 3A–B and 4A–B, several embodiments of a method in accordance with the present invention for controlling air charge motion in cylinder 14 during a transition from one combustion mode to another combustion mode will be described in detail. FIG. 3A illustrates a method for controlling air charge motion in cylinder 14 during a transition from a stratified combustion mode to a homogenous combustion mode with FIG. 4A illustrating the values of several variables in engine 10 over time during the transition. Conversely, FIG. 3B illustrates a method for controlling air charge motion in cylinder 14 during a transition from a homogenous combustion mode to a stratified combustion mode with FIG. 4B illustrating the values of the same variables in engine 10 over time during the transition. The inventive method or algorithm may be implemented by system 12 wherein ECU 62 is configured to perform several steps of the method by programming instruction or code (i.e., software). The instructions may be encoded on a computer storage medium such as a conventional diskette or CD-ROM and may be copied into one of memories 82, 84, 86 of ECU 62 using conventional computing devices and methods.

Referring again to FIGS. 3A–B, the inventive method may begin with several steps to preposition the components of engine 10 for the transition between combustion modes. These steps may include the step 88A, 88B of adjusting the position of throttle plate 44 and/or EGR valve 52. Referring to FIG. 1, ECU 62 may generate control signals to control plate 44 and valve 52. Referring to FIGS. 3A and 4A, when transitioning from a stratified combustion mode to a homogenous combustion mode, plate 44 and valve 52 are moved from relatively open positions $\theta_{thr\_s}$, $\theta_{egr\_s}$, respectively, to relatively closed positions $\theta_{thr\_h}$, $\theta_{egr\_h}$, to decrease the pressure in intake manifold 22 and the air charge in cylinder 14. Referring to FIGS. 3B and 4B, when transitioning from a homogenous combustion mode to a stratified combustion mode, plate 44 and valve 52 are moved in the opposite direction to achieve an increase in intake manifold pressure and cylinder air charge.

The inventive method may continue with the step 90A, 90B of positioning the intake valve 34 in cylinder 14 in a predetermined position in advance of the transition. Step 90A, 90B may include the substeps 92A, 92B and 94A, 94B of determining whether intake valve 34 is in the predetermined position and moving intake valve 34 to the predetermined position if intake valve 34 is in a position other than the predetermined position. Referring to FIGS. 3A and 4A, during a transition from a stratified combustion mode to a homogenous combustion mode, system 12 will actuate device 40 to move intake valve 34 to a long valve lift position $v_{long}$ if valve 34 is in a different position (e.g., a short valve lift position $v_{short}$). This action expedites removal of air from intake manifold 22. Referring to FIGS. 3B and 4B, during a transition from a homogenous combustion mode to a stratified combustion mode, system 12 will actuate device 40 to move intake valve 34 to a short valve lift position $v_{short}$ if valve 34 is in a different position (e.g., a long valve lift position $v_{long}$). This action slows removal of air from intake manifold. Step 90A, 90B is advantageous because it quickens the transition between combustion modes.

The inventive method may continue with the step 96A, 96B of adjusting the rate or amount of fuel injected by fuel injector 28 and/or the spark timing of spark plug 30. ECU 62 may generate control signals to fuel injector 28 and/or spark plug 30 to control fuel injection and spark timing, respectively, relative to a demanded torque for engine 10.

As set forth above, intake valve 34 is prepositioned in a first predetermined position prior to the transition between combustion modes. The inventive method then continues with the step 98A, 98B of moving intake valve 34 to a second predetermined position when a predetermined condition for transitioning between two combustion modes is met. Steps 98A, 98B may include substeps 100A, 100B and 102A, 102B. In substeps 100A, 100B, the predetermined condition is evaluated. In accordance with the illustrated embodiment of the invention, the predetermined condition is whether a torque demand for engine 10 and in-cylinder conditions meet a predetermined relationship. In the case of a transition from a stratified combustion mode to a homogenous combustion mode, the predetermined relationship is: $Tq^{dmd} \geq f_{tq}^{h}(N,P,\lambda_{hll},\delta_{max\text{-}retard},v_{short})$ where $f_{tq}^{h}$ is the torque regression for homogenous operation of engine 10, N is engine speed, P is pressure in intake manifold 22, $\lambda_{hll}$ is the homogenous lean limit air fuel ratio, $\delta_{max\text{-}retard}$ is the maximum spark retard and $v_{short}$ is the condition where intake valve 34 is in a short lift position. In the case of a transition from a homogenous combustion mode to a stratified combustion mode, the predetermined relationship is: $Tqd^{dmd} \leq f_{tq}^{s}(N,P,\lambda_{srl},\delta_{MBT},v_{long})$ where $f_{tq}^{s}$ is the torque regression for stratified operation of engine 10, N is engine speed, P is pressure in intake manifold 22, $\lambda_{srl}$ is the stratified rich limit air fuel ratio, $\delta_{MBT}$ is the maximum brake torque and $v_{long}$ is the condition where intake valve 34 is in a long lift position.

If the predetermined condition for transitioning between the two combustion modes is not met, the method returns to step 96A, 96B and repeats. If the predetermined condition is met, substep 102A, 102B occurs in which intake valve 34 is moved to the second predetermined position. ECU 62 may generate control signals to cam profile switching devices 40 to move intake valve 34 to the second predetermined position. In the case of a transition from a stratified combustion mode to a homogenous combustion mode, intake valve 34 is moved from a long lift position $v_{long}$ to a short lift position $v_{short}$ to reduce air induction into cylinder 14 as shown in FIGS. 3A and 4A. In the case of a transition from a homogenous combustion mode to a stratified combustion mode, intake valve 34 is moved from a short lift position $v_{short}$ to a long lift position $v_{long}$ to increase air induction into cylinder 14 as shown in FIGS. 3B and 4B. Concurrently with the movement of intake valve 34, ECU 62 may generate control signals to adjust the fuel injection timing of fuel injector 28. In the case of a transition from a stratified combustion mode to a homogenous combustion mode, ECU 62 may move the injection timing from late to early as shown in FIG. 4A. In the case of a transition from a homogenous combustion mode to a stratified combustion mode, ECU 62 may move the injection timing from early to late as shown in FIG. 4B.

The method may continue with the step 104A, 104B of adjusting the rate or amount of fuel injected by fuel injector 28 and/or the spark timing of spark plug 30. ECU 62 may generate control signals to fuel injector 28 and/or spark plug 30 to control fuel injection and spark timing, respectively, relative to a demanded torque for engine 10 and an optimal spark timing.

The method may then continue with the step 106A, 106B of determining whether one or more predetermined conditions are met. In the illustrated embodiment, ECU 62 determines whether engine torque Tq is equal to a demanded torque $Tq^{dmd}$, whether the pressure P in intake manifold 22 is equal to a desired intake manifold pressure $p^{dsd}$ and whether the air-fuel ratio $\lambda$ is equal to a desired air-fuel ratio $\lambda^{dsd}$. If any one of these conditions is not met in the transition from a homogenous combustion mode to a stratified combustion mode, the method returns to step 104B. If any one of these conditions is not met in the transition from a stratified combustion mode to a homogenous combustion mode, ECU 62 performs the step 108A in which ECU 62 compares the air-fuel ratio λ to the homogenous lean limit air-fuel ratio $\lambda^{hll}$. If the air-fuel ratio λ is at the homogenous lean limit air-fuel ratio $\lambda_{hll}$ and the demanded torque $Tq^{dmd}$ cannot be met, the method continues with the step 110A in which ECU 62 retards the timing of spark plug 30, and returns to step 106A.

Once the desired pressure $p^{dsd}$ in intake manifold 22 and air-fuel ratio $\lambda^{dsd}$ are obtained, the method may continue with the step 112A, 112B of determining whether intake valve 34 is in a desired steady state position $v^{dsd}$. If intake valve 34 is in the desired steady state position $v^{dsd}$, the algorithm terminates. If intake valve 34 is not in a position other than the desired steady state position $v^{dsd}$ ECU 62 may perform the step 114A, 114B by actuating cam profile switching devices 40 to move intake valve 34 to the desired steady state position $v^{dsd}$. Following step 114A, 114B, the method returns to step 104A, 104B.

A system and method in accordance with the present invention offer significant advantages. By using a cam profile switching device, the system can change intake valve lift during a single engine event. As a result, air charge motion can be directly and more quickly controlled than by using a swirl control valve or electronic throttle. The transition between combustion modes is therefore accomplished more quickly and LNT purge efficiency and fuel economy is improved. Further, and with reference to FIGS. 4A and 4B, a step change in the air charge can be effected during the transition between combustion modes thereby eliminating the need for a step change in the fueling rate and reducing torque disturbance and increasing drivability performance.

We claim:

1. A method for controlling air charge motion in a cylinder of an internal combustion engine during a transition between a first combustion mode and a second combustion mode, comprising the steps of:
   positioning an intake valve for said cylinder in a first position in advance of said transition using a cam profile switching device; and,
   moving said intake valve to a second position using said cam profile switching device when a predetermined condition for transitioning between said first and second combustion modes is met.

2. The method of claim 1 wherein said engine comprises a direct injection spark ignition engine.

3. The method of claim 1 wherein one of said first and second combustion modes comprises a homogenous mode wherein a homogenous mixture of air and fuel is present in said cylinder and another of said first and second combustion modes comprises a stratified mode wherein a stratified mixture of air and fuel is present in said cylinder.

4. The method of claim 1 wherein said positioning step includes the substeps of:
   determining whether said intake valve is in said first position; and,
   moving said intake valve to said first position if said intake valve is in a position other than said first position.

5. The method of claim 1 wherein said predetermined condition for transitioning between said first and second combustion modes is whether a torque demand for said engine meets a predetermined relationship.

6. The method of claim 1, further comprising the step of adjusting a time at which fuel is injected into said cylinder concurrently with said moving step.

7. The method of claim 1, further comprising the steps of:
   determining whether said intake valve is in a steady state position once a desired pressure in an intake manifold of said engine is obtained and a desired air-fuel ratio in said cylinder is obtained;
   moving said intake valve to said steady state position if said intake valve is in a position other than said steady state position.

8. A system for controlling air charge motion in a cylinder of an internal combustion engine during a transition between a first combustion mode and a second combustion mode, comprising:
   a cam profile switching device coupled to an intake valve for said cylinder; and,
   an electronic control unit configured to control the cam profile switching device to position said intake valve in a first position in advance of said transition and move said intake valve to a second position when a predetermined condition for transitioning between said first and second combustion modes is met.

9. The system of claim 8 wherein said engine comprises a direct injection spark ignition engine.

10. The system of claim 8 wherein said one of said first and second combustion modes comprises a homogenous mode wherein a homogenous mixture of air and fuel is present in said cylinder and another of said first and second combustion modes comprises a stratified mode wherein a stratified mixture of air and fuel is present in said cylinder.

11. The system of claim 8 wherein said electronic control unit is further configured, in positioning said intake valve in a first position in advance of said transition, to determining whether said intake valve is in said first position and to move said intake valve to said first position if said intake valve is in a position other than said first position.

12. The system of claim 8 wherein said predetermined condition for transitioning between said first and second combustion modes is whether a torque demand for said engine meets a predetermined relationship.

13. The system of claim 8, wherein said electronic control unit is further configured to adjust a time at which fuel is injected into said cylinder concurrently with moving said intake valve to said second position.

14. The system of claim 8 wherein said electronic control unit is further configured to determine whether said intake valve is in a steady state position once a desired pressure in an intake manifold of said engine is obtained and a desired air-fuel ratio in said cylinder is obtained and to move said intake valve to said steady state position if said intake valve is in a position other than said steady state position.

15. An article of manufacture, comprising:
   a computer storage medium having a computer program encoded thereon for controlling air charge motion in a cylinder of an internal combustion engine during a transition between a first combustion mode and a second combustion mode, said computer program including code for:
   positioning an intake valve for said cylinder in a first position in advance of said transition using a cam profile switching device; and,
   moving said intake valve to a second position using said cam profiled switching device when a predetermined condition for transitioning between said first and second combustion modes is met.

16. The article of manufacture of claim 15 wherein said engine comprises a direct injection spark ignition engine.

17. The article of manufacture of claim 15 wherein one of said first and second combustion modes comprises a homogenous mode wherein a homogenous mixture of air and fuel is present in said cylinder and another of said first and second combustion modes comprises a stratified mode wherein a stratified mixture of air and fuel is present in said cylinder.

18. The article of manufacture of claim 15 wherein said code for positioning said intake valve includes:
- code for determining whether said intake valve is in said first position; and,
- code for moving said intake valve to said first position if said intake valve is in a position other than said first position.

19. The article of manufacture of claim 15 wherein said computer program further includes code for adjusting a time at which fuel is injected into said cylinder concurrently with moving said intake valve to said second position.

20. The article of manufacture of claim 15 wherein said computer program further includes:
- code for determining whether said intake valve is in a steady state position once a desired pressure in an intake manifold of said engine is obtained and a desired air-fuel ratio in said cylinder is obtained; and,
- code for moving said intake valve to said steady state position if said intake valve is in a position other than said steady state position.

* * * * *